United States Patent [19]

Stampfli

[11] 4,010,390

[45] Mar. 1, 1977

[54] ELECTROMAGNETIC ACTUATOR COMPRISING A PLUNGER CORE

[75] Inventor: Harald Stampfli, Petit-Saconnex, Switzerland

[73] Assignee: Lucifer S.A., Carouge-Geneva, Switzerland

[22] Filed: May 16, 1975

[21] Appl. No.: 578,362

[30] Foreign Application Priority Data

May 24, 1974 Switzerland ....................... 7094/74

[52] U.S. Cl. .................................... 310/30; 310/19

[51] Int. Cl.$^2$ ....................................... H02K 33/02

[58] Field of Search ................... 310/19, 30, 34, 35

[56] References Cited

UNITED STATES PATENTS

| | | | |
|---|---|---|---|
| 1,019,213 | 3/1912 | Adams | 310/19 X |
| 2,905,871 | 9/1959 | Martin | 310/36 X |
| 3,755,700 | 8/1973 | Buschmann et al. | 310/30 |

*Primary Examiner*—Donovan F. Duggan
*Attorney, Agent, or Firm*—Emory L. Groff, Jr.

[57] ABSTRACT

An electromagnetic actuator having a plunger core and a stationary ferromagnetic core, both surrounded by an electrical winding, is provided with means for adjusting the axial position of the stationary core in relation to the winding, said means being operable from outside the actuator.

4 Claims, 2 Drawing Figures

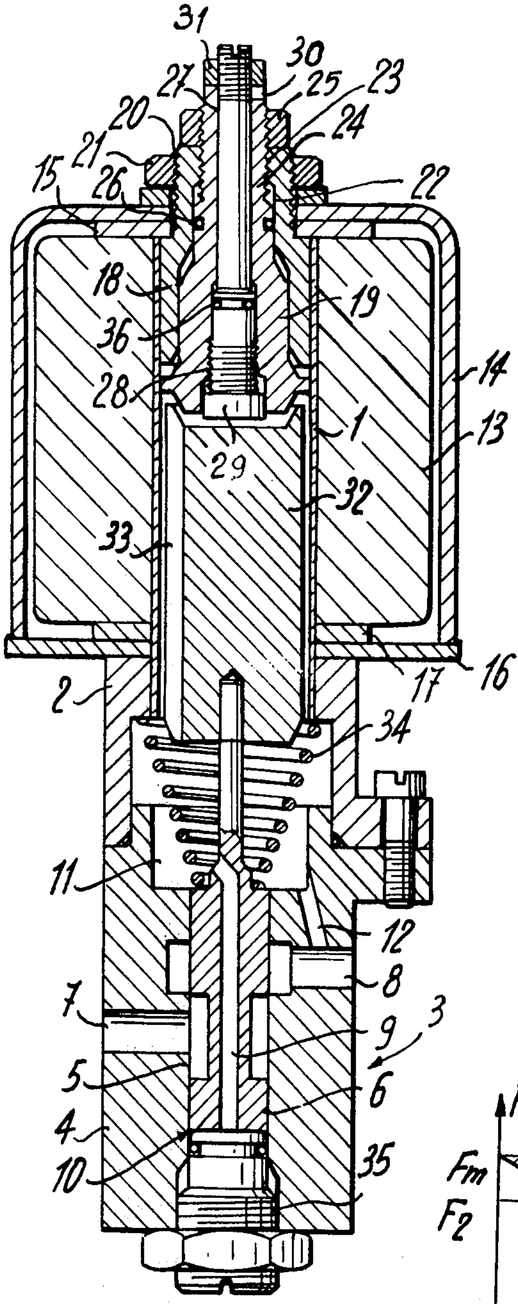
FIG. 1
FIG. 2
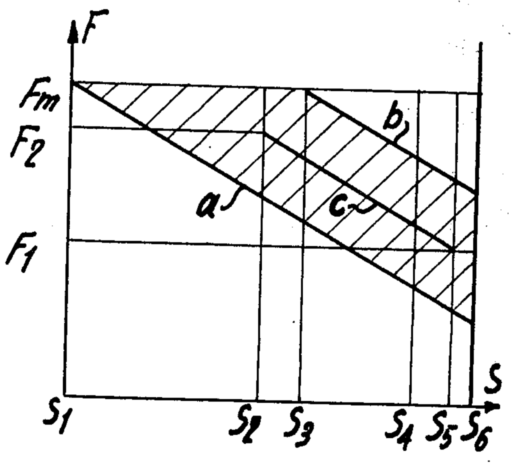

ELECTROMAGNETIC ACTUATOR COMPRISING A PLUNGER CORE

This invention relates to an electromagnetic actuator comprising a plunger core and a stationary ferromagnetic core, both surrounded by an electrical winding.

It is known to provide actuators of this kind with certain adjustment facilities, but such adjustment generally comprises being able to vary the length of a connecting element between the magnetic core and the member actuated by said core. Usually such adjustment is possible only after the device has been dismantled.

Such dismantling is a considerable disadvantage and it has been proposed to obviate it by providing means whereby the system comprising the actuator and the member controlled by the latter can be displaced in relation to the remainder of the device.

It has also been proposed to limit the displacement of the magnetic core in one direction by the use of a stop which is adjustable from outside the actuator.

The object of this invention is to enable an electromagnetic actuator to be adjusted very easily. To this end, the actuator according to the invention is characterised in that it comprises means for adjusting the axial position of the stationary core in relation to the winding, said means being operable from outside the actuator. More particularly, with this arrangement it is possible to adjust the force of electromagnetic attraction.

The accompanying drawing illustrates one embodiment of the actuator according to the invention, diagrammatically and by way of example.

FIG. 1 is a section of this embodiment.

FIG. 2 is a diagram showing the possible adjustments of the magnetic attraction and of the travel of the actuator according to FIG. 1.

Referring to FIG. 1, the actuator comprises a tube 1 of non-magnetic material, the bottom part of which is connected to a part 2 whereby the actuator can be secured to a device 3 which, in this case, is a spool valve. This valve comprises a body 4 formed with a bore 5 in which a spool 6 slides to control the communication between two ports 7 and 8.

In order to prevent the outer surfaces of the spool 6 from being subjected to forces due to the pressure of the fluid under control, the spool is formed with a central bore 9 providing communication between two chambers 10 and 11 and formed at each end of the spool, chamber 11 itself communicating with port 8 via bore 12.

Tube 1 is located inside an electrical winding 13 protected by a cap 14 of ferromagnetic material which, together with washers 15, 16 and 17, forms a part of the magnetic circuit of the actuator. This circuit further comprises a stationary core made up of two ferromagnetic parts 18 and 19. Part 18 is fixed with respect to tube 1 and has a screwthread 20 for a nut 21 which secures the cap 14. Part 18 also has a cylindrical surface 22 and a screwthreaded bore 23 into which is screwed a threaded end 24 of the part 19 which is thus axially displaceable in part 18 by rotation when a suitable tool is introduced into the slot 30. A lock-nut 25 enables part 19 to be locked in the selected position. A toric gasket 26 provides a seal between the two parts 18 and 19.

Part 19 also has a bore 27 screwthreaded at 28, into which a non-magnetic stop 29 is introduced. Stop 29 can be reached from outside by means of a screwdriver for axial displacement by screwing.

The position selected is secured by tightening a nut 31 screwed on to the screwthreaded end of the stop 29. A toric gasket 36 provides the seal between the stop 29 and the part 19.

Finally, the actuator also comprises a plunger core 32 of ferromagnetic material, the outer wall of which has a longitudinal slot 33 to facilitate its displacement in the fluid surrounding it. The plunger core 32 is connected to the element it controls, in this case the spool 6, by screwing one end of said spool into a corresponding screwthreaded hole in the plunger core. The assembly comprising the core and spool is biased by a spring 34 which tends to move the plunger core 32 away from the stationary core 18, 19 and apply it against an adjustable stop 35 situated opposite the bottom end of the spool 6. This stop enables the initial position of the spool 6 to be adjusted when the plunger core is in the non-attracted state, thus enabling the degree of closure of the fluid passage between the ports 7 and 8 to be determined.

The magnetic air-gap between the stationary core 18, 19 and the plunger core 32 can be adjusted for the attracted position of the latter by adjusting the position of the non-magnetic stop 29. This adjustment therefore enables the magnetic flux and hence the attraction, when the core 32 is in the attracted position, to be directly controlled.

When this latter adjustment has been carried out, the position of the core 32 in the attracted state can be adjusted by adjusting the movable part 19 of the stationary core. This adjustment in combination with the position of the stop 35 determines the initial attraction in the non-attracted position.

The magnetic forces acting on the core can be varied within wide limits by means of these three adjustments.

The possible effect of the above various adjustments on the attraction is illustrated by the diagram in FIG. 2, in which the force is indicated by they-axis against the position of the spool 6 which is indicated by S on the x-axis. The maximum force of attraction $F_m$ is obtained when the air-gap between the part 19 and the plunger core is zero, and this can be obtained with the spool 6 in a position $s_1$ or $s_3$. Position $s_1$ corresponds to the case in which the stop 29 is introduced into part 19 to the maximum, part 19 also being introduced into part 18 to the maximum. In this case, the force of attraction is denoted by curve *a* which of course decreases when the air-gap increases, until the position $s_6$ which corresponds to the case in which the stop 35 allows maximum movement of spool 6 in the released position of the plunger core. Position $s_4$ corresponds to the maximum limitation of the movement of the spool 6 obtained by the stop 35.

Curve *b* illustrates the force of magnetic attraction in the case in which the stop 29 is introduced into part 19 to the maximum, part 19 then being moved to the maximum in the direction of the core 32 so that the end position of the spool 6 with the core 32 in the attracted position is denoted by $s_3$. It is clear that any intermediate curve can be obtained between the two extreme curves *a* and *b*, for example curve *c* can be obtained in which the part 19 and the stops 29 and 35 occupy different positions from their end positions and which represents initial and final attraction forces $F_1$ and $F_2$ respectively for a spool travel between $s_2$ and $s_5$.

It will thus be seen that it is possible to change considerably the operating characteristics of the magnetic actuator by means of adjusting elements, all of which are accessible from outside. These adjustments can therefore be carried out without any need for the device to be dismantled and even during its operation.

We claim:

1. An electromagnetic actuator with a plunger core and a stationary ferromagnetic core, both surrounded by an electrical winding, said actuator comprising means for adjusting the axial position of the stationary core in relation to the winding and adjusting the initial attraction force without changing the initial position of the plunger core in relation to the winding, said means being operable from outside the actuator, said stationary core comprising two ferromagnetic parts, one of which is located partly inside the other and is axially displaceable in relation to the outer part, the latter being fixed in relation to the winding and to the external magnetic circuit.

2. The actuator as defined in claim 1, wherein the displaceable part is provided with a stop of non-magnetic material intended to limit the displacement of the movable core towards the stationary core, the position of said stop being adjustable with respect to said displaceable part from outside the actuator.

3. The actuator as defined in claim 1, wherein the inner part of the stationary core is screwed into the outer fixed part.

4. An electromagnetic actuator with a plunger core and a stationary ferromagnetic core, both surrounded by an electrical winding, said actuator comprising means for adjusting the axial position of the stationary core in relation to the winding and adjusting the initial attraction force without changing the initial position of the plunger core in relation to the winding, said means being operable from outside the actuator, said stationary core including a displaceable part provided with a stop of non-magnetic material intended to limit the displacement of the movable plunger core towards the stationary core, the position of said stop being adjustable with respect to said displaceable part from outside the actuator.

* * * * *